(12) United States Patent
Step et al.

(10) Patent No.: US 10,450,493 B2
(45) Date of Patent: Oct. 22, 2019

(54) MODIFIED CARBON BLACK FOR OILFIELD FLUIDS

(71) Applicant: Cabot Corporation, Boston, MA (US)

(72) Inventors: Eugene N. Step, Newton, MA (US); Michael J. Natan, Weston, MA (US)

(73) Assignee: Cabot Corporation, Boston, MA (US)

(*) Notice: Subject to any disclaimer, the term of this patent is extended or adjusted under 35 U.S.C. 154(b) by 58 days.

(21) Appl. No.: 15/127,958

(22) PCT Filed: Mar. 26, 2015

(86) PCT No.: PCT/US2015/022720
§ 371 (c)(1),
(2) Date: Sep. 21, 2016

(87) PCT Pub. No.: WO2015/148793
PCT Pub. Date: Oct. 1, 2015

(65) Prior Publication Data
US 2017/0096593 A1  Apr. 6, 2017

Related U.S. Application Data

(60) Provisional application No. 61/971,988, filed on Mar. 28, 2014.

(51) Int. Cl.
C09K 8/36 (2006.01)
C09C 3/08 (2006.01)
C09C 1/56 (2006.01)

(52) U.S. Cl.
CPC .......... *C09K 8/36* (2013.01); *C09C 1/56* (2013.01); *C09C 3/08* (2013.01); *C01P 2006/12* (2013.01); *C01P 2006/19* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 6,770,603 B1 * | 8/2004 | Sawdon | C09K 8/36 166/254.2 |
| 2011/0059871 A1 | 3/2011 | Tour et al. | |
| 2011/0111988 A1 | 5/2011 | Ionescu Vasii et al. | |
| 2011/0236816 A1 * | 9/2011 | Stanyschofsky | C09C 1/44 430/108.9 |
| 2011/0254553 A1 | 10/2011 | van Zanten | |

(Continued)

FOREIGN PATENT DOCUMENTS

WO  WO 2014/089214 A2  6/2014

OTHER PUBLICATIONS

Mark, et al.: "Encyclopedia of Polymer Science and Engineering, vol. 2, Carbon Black, pp. 623-637", Jan. 1, 1985, XP002140365.

(Continued)

*Primary Examiner* — Jeffrey D Washville (57) ABSTRACT

Surface treated modified carbon black particles and oil-based drilling fluids are described. The carbon blacks are incorporated into the oil-based drilling fluids to reduce the electrical resistivity of the oil-based drilling fluids. The surface treated carbon blacks can include a hydrophobic organic group and are readily dispersible in oil-based drilling fluids.

8 Claims, 3 Drawing Sheets

(56) References Cited

U.S. PATENT DOCUMENTS

2013/0261030 A1   10/2013  Monteiro et al.
2015/0284619 A1*  10/2015  Price Hoelscher ...... C09K 8/32
                                                                          175/45

OTHER PUBLICATIONS

Notification of Transmittal of the International Search Report and the Written Opinion of the International Searching Authority, or the Declaration of International Patent Application No. PCT/US2015/0022720, dated Jun. 16, 2015.

* cited by examiner

MODIFIED CARBON BLACK FOR OILFIELD FLUIDS

This application is a national phase of PCT/US2015/022720, filed Mar. 26, 2015, which claims priority from U.S. 61/971,988, filed Mar. 28, 2014.

FIELD OF THE DISCLOSURE

The present disclosure relates to carbon blacks and, in particular, to surface treated carbon blacks for use in oilfield fluids.

BACKGROUND

Carbon black particles are used in a number of fields, including inks, coatings, toners, adhesives, pipes, cables and color filters. In many cases, carbon blacks are dispersed in a liquid vehicle that can be either aqueous or non-aqueous. Carbon blacks can be treated with different materials to render them more readily dispersible in either aqueous or non-aqueous systems. Oil-based drilling fluids, often referred to as oil-based drilling muds (OBM), are often used to facilitate the drilling of oil and natural gas wells.

SUMMARY

In one aspect a conductive organic drilling fluid is provided, the drilling fluid comprising an invert emulsion including a continuous organic phase and an emulsified aqueous phase, a surface treated carbon black dispersed in the invert emulsion at a concentration of at least 0.5% by weight, and wherein the conductive organic drilling fluid has a volume resistivity of less than $10^5$ ohm-m.

In another aspect, an organic drilling fluid is provided, the organic drilling fluid comprising a non-conductive continuous phase of organic or synthetic liquid, an aqueous phase supported in the liquid as an invert emulsion, and a modified carbon black, preferably a surface treated carbon black, dispersed in the solvent at a concentration of at least 0.5% by weight, wherein the drilling fluid exhibits a resistivity that is at least 100 times lower than the resistivity of the non-conductive continuous phase.

In another aspect, a method of producing an electrically conductive organic drilling fluid is provided, the method comprising emulsifying a brine in a non-conductive organic liquid to produce a two-phase system, the brine making up less than 45% by weight of the two-phase system, dispersing a plurality of carbon black particles in the two phase system to produce the conductive organic drilling fluid, and wherein the drilling fluid has an electrical resistivity of less than $10^5$ ohm-m, $10^4$ ohm-m, $10^3$ ohm-m, $10^2$ ohm-m, or 10 ohm-m, for example, at least 1 ohm-m or 10 ohm-m.

In another aspect, a method of reducing the volume resistivity of an organic system is provided, the method comprising forming an organic system comprising an emulsion, the emulsion including a continuous organic phase and an emulsified aqueous phase, forming a dispersion of a modified carbon black, preferably a surface treated carbon black, in the organic system wherein the dispersion has a volume resistivity at least 100 or 500 times lower than the organic system in the absence of the modified carbon black, and maintaining the emulsion and the dispersion for at least 24 hours.

DETAILED DESCRIPTION

In one aspect, a modified carbon black is dispersed in an oil-based drilling fluid to increase the electrical conductivity of the fluid. The electrically conductive drilling fluid, which may be a logging medium, can be accurately imaged using microresistivity logging tools in the borehole. The modified carbon black can be a surface treated carbon black. A surface treated carbon black is a carbon black particle that has been treated with a substance to alter one or more properties of the carbon black surface. The surface treated carbon black may be treated with an organic compound that is attached to the carbon black. The organic compound may be a small molecule, oligomer, or polymer. The low resistivity of the oil-based drilling fluid can be maintained when the fluid is under shear, for instance, when the fluid is pumped through a drill bit or bore hole. In many embodiments the carbon black does not alter, or only minimally affects, properties of the drilling fluid such as viscosity, density, pH and corrosivity. The carbon black may be compatible with other drilling fluid additives such as weighting agents, pressure additives, emulsifiers, corrosion control additives and biocides.

Drilling fluids, or drilling muds, are used in the drilling of oil and gas wells and fill various needs, including providing hydrostatic pressure and cooling the drill bit. Although gases can be used as drilling fluids, the embodiments herein are directed to liquid based fluids. The three major types of liquid drilling fluids in use today are water-based fluids, oil-based fluids and synthetic-based fluids. Drilling fluids can be thixotropic and may form gels under static conditions while exhibiting reduced viscosity under shear forces, such as when being pumped through a drill bit. They may contain a variety of additive packages to improve the performance and durability of the fluids under harsh temperatures and pressures.

Drilling fluids, or wellbore fluids, can comprise single phase or multiphase fluids. For example, drilling fluids can comprise water-in-oil emulsions, oil-in water emulsions, oil-based drilling fluids, synthetic drilling fluids, aqueous-based drilling fluids, emulsion-based drilling fluids, invert-emulsion-based drilling fluids, conductive drilling fluids, magnetic drilling fluids, oil-based wellbore fluids, oil-based muds (OBMs), water-in-oil invert emulsions, oil-in-water direct emulsions, and combinations of such fluids. Oil-based drilling fluids are based on organic fluids such as diesel or mineral oil, and can be, for example, napthenic (cyclic alkanes) based, paraffin based, or alkane based. As used herein, organic fluids are hydrocarbon-based fluids that are either immiscible with water or are insoluble in pure water at room temperature at concentrations of greater than 1% by weight. In some cases, organic fluids may be fluids that have a dielectric constant at room temperature of less than 80, less than 50, less than 30, less than 10, less than 5 or less than 3. For example, diesel has a dielectric constant of about 2.1 and mineral oil has a dielectric constant of about 2.3. Oil-based fluids include invert emulsion fluids (IEF) such as those used in high pressure high temperature (HPHT) applications. Synthetic drilling fluids are fluids that are not naturally occurring but are made by man and can be derived from hydrocarbons. As used herein, oil-based drilling fluids and synthetic drilling fluids are both referred to as organic drilling fluids. These drilling fluids can be a two phase system that includes an organic fluid phase and an aqueous fluid phase; in an organic drilling fluid, the organic phase is continuous. The fluids may contain water or brine in the form of an invert emulsion in the organic phase. In these cases, the two phase system can include a continuous organic phase containing discontinuous aqueous phase droplets. The organic phase may be electrically non-conductive while the aqueous phase can be conductive. A material is electrically non-conductive if it has a volume resistivity of 100,000 ohm-m or more. A material is electrically conductive if it has a volume resistivity of less than 100,000 ohm-m. Organic drilling fluids are typically non-conductive.

The treated carbon blacks disclosed herein can be used with any known invert emulsion systems. Invert emulsions include a non-aqueous phase that forms an invert emulsion with brine. Some invert emulsion systems are reversible (i.e., between water-in-oil and oil-in water). The non-aqueous phase can include one or more non-aqueous compounds. These compounds can include, for example, one or more of esters, diesters, oligomeric esters, triglyceride esters, fatty acid esters, polyalpha olefins, acetals, oleophilic esters, oleophilic alcohols, base oils, diesel oil, white oil, alkyl benzenes, glycosides, methyl glucosides, quaternary oleophilic esters of alkylolamines, ethers of monofunctional alcohols, didecyl ethers, polyether amine, oleophilic amides, oleophilic alcohols and phosphate esters of a hydroxyl polymer. Commercial non-aqueous compounds include XP-07 base fluid from Halliburton and ESCAID® oil from ExxonMobil. Commercial invert emulsion systems include ACCOLADE®, ENCORE®, INTEGRADE®, INNO-VERT®, and ENVIROMUL® systems, all from Halliburton. An invert emulsion drilling fluid may include, for example, one or more of these organic compounds and/or commercial fluids and an incompatible aqueous fluid, such as brine, e.g., 25% calcium chloride in water. Invert emulsions typically include a surfactant that may be ionic or non-ionic. In some cases, the surfactant is an amine based surfactant.

Aqueous droplets in these drilling fluids can be, for example, from 1 to 50 microns in size. Organic drilling fluids can include, for example, from 1% to 75% of either water or brine, by weight, and the most prevalent fluids typically include from about 5% to about 40% of either brine or water by weight. Brines may be made from one or more aqueous soluble salts such as halide salts including calcium chloride. Brines may contain, for example, greater than 1%, greater than 5%, greater than 10%, greater than 20%, greater than 30% or greater than 50% salt by weight and may be saturated. In these and other embodiments, the brine may contain less than 50%, less than 30%, less than 10% or less than 5% salt by weight. An exemplary brine is standard American Petroleum Institute (API) standard brine (8% NaCl+2% $CaCl_2$ by weight). The water or brine is typically a distinct second phase that is emulsified in the organic phase and is not dissolved in the organic phase. As the emulsified aqueous droplets are typically not in contact with each other, they do not form an electrical pathway and organic drilling fluids often exhibit a high volume resistivity of, for example, about $10^7$ to $10^9$ ohm-m.

Oilfield fluids such as drilling muds may contain a variety of additional additives including, for instance, density and viscosity modifiers such as barite and bentonite. Additives for controlling high pressure/high temperature fluid loss include, for example, organophilic materials such as lignitic, asphaltic and polymeric compounds. Wetting agents and surfactants are often employed, and pH increasers such as calcium oxide (lime) can be used to maintain high pH in conditions where acidifying compounds such as hydrogen sulfide and carbon dioxide are encountered. Additional additives include fluid loss additives, clay stabilization agents, lubricants, microbial control agents, corrosion inhibitors, scale inhibitors, gelling agents, cement additives, grad reducers, has hydrate controllers, antifreeze additives, odorizing agents, water shutoff agents, dispersants, emulsifiers, foams and demulsifiers. The surface treated carbon blacks described herein can be engineered to be compatible with any or all of these additive types.

Measurements in and around petroleum boreholes often include techniques based on the electrical properties of a drilling fluid. These methods include electrical logging techniques, such as resistivity logging, image logging, porosity logging, density logging, neutron porosity logging and sonic logging. Many of these tests, and others, rely at least partially on the electrical conductivity of a fluid. These processes include, for example, well logging that records electrical resistivity data based on time and/or distance. A variety of electrical resistance based techniques can be employed, however the continuous organic phase that is typical of organic drilling fluids means that these fluids often exhibit high electrical resistivity. This high electrical resistivity, even in the presence of water or brine, makes it difficult to perform electrical measurements in and around the fluids. Techniques for measuring resistivity that can be used with aqueous based drilling fluids are often not compatible with organic drilling fluid systems due to the high resistivity of these fluids. These resistivity based techniques include microresistivity imaging.

Microresistivity imaging can be performed using a variety of instrumentation and techniques, and methods using both alternating current and direct current are employed in the petroleum industry. Resistivity logging methods include, for example, high-definition induction logging, dual phase induction logging, dual lateral logging and high-definition lateral logging. Measurements can be made using single pairs of electrodes or with multi-electrode arrays. Attempts to provide additives to reduce the electrical resistance of organic fluids have proven to be ineffective due to, for example, either an insufficient decrease in resistivity or to incompatibilities with the fluids or with additives contained in the fluids. Some of these incompatibilities may not be apparent in static systems and may not come to light until the fluid is under shear or under pressure, such as in a drilling operation. For instance, parameters such as corrosiveness and dynamic viscosity can be critical in drilling operations and may be affected by any additives designed to decrease electrical resistivity in a drilling fluid.

Many of the carbon blacks disclosed herein may have a positive or neutral effect on the rheology of the drilling fluid. For example, viscosity control, and in particular dynamic viscosity control, can be of great importance for the successful operation of drilling fluids, and the addition of any materials should not alter viscosity to a level where performance is adversely affected. For instance, an unwanted increase in viscosity can reduce pressure and flow rates while a decrease in viscosity can alter the fluid's ability to lift cuttings to the surface. The carbon blacks described herein can be incorporated into organic drilling fluids at high loadings without a significant increase in dynamic viscosity. For example, in some embodiments, modified carbon blacks added at levels of at least 0.5%, 1%, 3%, 5%, 7% or up to 10% by weight may cause an increase in Marsh Funnel viscosity (API RP 13B) of less than 50%, less than 20% or less than 10%.

While many organic drilling fluids are gels under static conditions they are easily liquefied under stress. Thus, in many embodiments, the addition of modified carbon blacks to organic drilling fluids does not adversely affect the yield stress of the drilling fluid. For example, at concentrations of at least 0.5%, 1%, 3%, 5%, 7% or up to 10% by weight, the yield stress of the drilling fluid may be increased by less than 20% or less than 10% when compared to the same drilling fluid without any added carbon black.

It is surprising to note that some of the lowest resistivities in drilling fluids can be achieved at relatively low concentrations of modified carbon black, such as 5% and 7% by weight. This is contrary to conventional belief that higher concentrations of carbon black would provide for greater conductivity. It is also notable that higher loadings of organic treating agent on the carbon black do not necessarily provide for the greatest reduction in resistivity. Without being bound by any particular theory, it is thought that at higher treatment levels, the surface treatment interferes with the conduction of electrons between carbon black particles. In a non-conductive matrix, carbon black particles exhibiting higher structure also provide higher volume conductivity at lower loadings, independent of surface area. However, higher structure particles also impart increased viscosity to fluid systems. This increase in viscosity means that these carbon blacks are not viable as electrical conductivity increasers in drilling fluids. However, the use of relatively low levels of a hydrophobic treating agent increases the compatibility of the modified carbon black with the organic component of the drilling fluid, preventing flocculation and reducing viscosity.

As described herein, certain modified carbon blacks, when incorporated in an organic drilling fluid, have been shown to decrease the resistivity of organic drilling fluids, such as OBMs, to a level where microresistivity logging can be performed with currently available instrumentation. For instance, the inclusion of at least 0.5%, 1%, 3%, 5%, 7% or up to 10% by weight of a modified carbon black, in an organic drilling fluid can reduce resistivity to less than $10^5$, less than $10^4$, less than $10^3$, less than $10^2$, less than 10, or as little as 1 ohm-m, for example, between 10 ohm-m and $10^5$ ohm-m or between 1 ohm-m and $10^5$ ohm-m in static systems or in dynamic systems. The modified carbon black may have positive or neutral effects with regard to parameters such as pH, emulsion stability, lubricity, heat transfer, viscosity and density. In some embodiments, these parameters may be altered, but not to an extent where the usefulness of the fluid is impaired.

In some cases, the addition of a modified carbon black to an organic drilling fluid can reduce the resistivity of the fluid by a factor of greater than $10^2$, greater than 500, greater than $10^3$, greater than $10^4$, or up to $10^5$ when compared to the same fluid without the carbon black under the same conditions. This reduction in resistivity can be measured under either static or dynamic conditions. In some embodiments, the modified carbon blacks can be useful with microresistivity systems using AC voltage, in systems using DC voltage, or in both. Resistivity can be measured in a fluid, emulsion or dispersion using, for example, a Keithley Model 6517A High Resistivity Meter with an ETS Model 828 cell at a time of 30 seconds.

The modified carbon black may have a primary particle size range of, for example, 3 nm to 200 nm, 5 to 100 nm, 10 nm to 80 nm or 15 nm to 50 nm. In some embodiments, the carbon black may have a primary particle size of less than 200 nm, less than 160 or less than 120 nm. The aggregate size of the particles may be less than 250 nm or less than 150 nm, for example, from 100 nm to 250 nm. Size distribution of the carbon black particles may be single modal or multimodal, including bimodal. M-ratio, as used in the art, is the ratio of the median of the Stokes diameter of the particles divided by the mode of the Stokes diameter of the particles. Thus, as the M-ratio approaches 1, the mode and the mean of the particle size distribution move closer together. In some embodiments, the M-ratio of the modified carbon black can be less than 1.5, less than 1.25, less than 1.15, less than 1.10, less than 1.05 or less than 1.0. In these and other embodiments the M-ratio can be greater than 0.95, greater than 1.00, greater than 1.10 or greater than 1.20.

In many embodiments, the carbon black may exhibit high structure. For example, the base carbon black (before modification), or the modified carbon black, can exhibit an OAN (by dibutylphthalate absorption, ASTM D2414) value greater than 150 mL/100 g, greater than 170 mL/100 g, or greater than 200 mL/100 g. The OAN structure may also be less than 500 mL/100 g, less than 300 mL/100 g or less than 250 mL/100 g. Modification of the carbon black may alter the structure of the particle and therefore structure values may be different before and after treatment.

It is believed that surface structure is of greater significance than is surface area in selecting treated carbon blacks to improve the conductivity of drilling fluids. For example, as shown in the examples below, increasing structure enabled dramatic increases in performance in comparison to changes in surface area. In some embodiments, the surface area of the particles may be limited to a particular range. The BET surface areas of specific carbon blacks, as measured by nitrogen adsorption (ASTM D6556) prior to or after modification, can be between 10 $m^2/g$ and 3000 $m^2/g$, between 10 $m^2/g$ and 1000 $m^2/g$, between 10 $m^2/g$ and 350 $m^2/g$, between 20 $m^2/g$ and 200 $m^2/g$, or between 30 $m^2/g$ and 150 $m^2/g$. In some embodiments, the BET surface area of the particles can be greater than 25 $m^2/g$, greater than 50 $m^2/g$, greater than 100 $m^2/g$ or greater than 200 $m^2/g$. In these or other embodiments, the BET surface area of the particles can be less than 500 $m^2/g$, less than 200 $m^2/g$, less than 150 $m^2/g$, less than 100 $m^2/g$, or less than 50 $m^2/g$.

Treating agents and/or the resulting organic groups that are attached to the carbon black particles may be formed from a variety of compounds that vary in structure and molecular weight. For modified particles, a portion of the surface area may be covered by the treating material. The modification of the carbon black renders it more hydrophobic to improve compatibility with the organic component of the organic drilling fluid. In contrast, the use of ionic or ionizable treating agents render the carbon black more hydrophilic. In some embodiments, a balance is struck between a level of treatment required for dispersion in organic fluids and retention of enough available particle surface to provide for electrical conductivity between adjacent particles. For instance, in some embodiments, the carbon black particles can include a treating agent such an organic group, polymer or oligomer that may partially or totally cover the surface of the carbon black particle. In these cases, the treating agent may cover less than 100%, less than 90%, less than 50%, less than 20% or less than 10% of the surface of the carbon black. Similarly, in these or other cases, the treating agent may cover greater than 10%, greater than 20%, greater than 50%, greater than 75% or greater than 90% of the surface of the carbon black particles. For example, one or more polymers or oligomers may be present at a surface concentration of 0.1 to 1.5 $\mu mol/m^2$, 0.2 to 1.25 $\mu mol/m^2$, 0.5 to 1 $\mu mol/m^2$, 0.3 to 0.75 $\mu mol/m^2$, or 0.75 to 1.5 $\mu mol/m^2$. In cases where the polymer or oligomer is formed from the treatment group, the polymer may be formed prior to, concurrently with, or after the treatment group attaches to the carbon black particle. For example, one treatment group molecule may attach to the carbon black particle and then additional treatment group molecules may bind with or associate with the attached treatment group particle. This process may continue to form oligomers or polymers of 2, 3, 4, 5, 6, 7 or more treatment molecule units. In other cases, oligomers or polymers of the treatment group may form in solution and can subsequently bind to the surface of the carbon black particle. The formation of oligomers or polymers can therefore render the treated particle more hydrophobic and dispersible in non-aqueous fluids while retaining enough available conductive surface area to achieve conductivity between adjacent particles. It is also believed that treated high structure carbon blacks, i.e., pre-treatment OAN of greater than 150 mL/100 g, can be important in achieving oleophilic compatibility while allowing for improved electrical conductivity.

As used herein, the term carbon black is used as is known in the art and means particles of carbon produced through partial combustion of hydrocarbons. Carbon blacks do not include carbon containing materials such as carbon nanotubes, graphite, graphene and fullerenes. Carbon blacks are known to those skilled in the art and include channel blacks, furnace blacks, gas blacks, and lamp blacks. Carbon blacks from a variety of suppliers can be used as a base carbon black that can be modified with an organic group. Some commercially available carbon blacks are sold under the Regal®, Black Pearls®, Elftex®, Monarch®, Mogul®, Spheron®, Sterling®, and Vulcan® trademarks and are available from Cabot Corporation. Other commercially available carbon blacks include but are not limited to carbon blacks sold under the Raven®, Statex®, Furnex®, and Neotex® trademarks and the CD and HV lines available from Columbian Chemicals, and the Corax®, Durax®, Ecorax®, and Purex® trademarks and the CK line available from Orion Engineered Carbons.

The modification of carbon black particles can be a chemical treatment that renders the carbon black dispersible in the fluid and helps to lower the electrical resistivity of the fluid. As used herein, a particle is dispersible in a fluid if the size of the dispersed particles does not measurably increase under static conditions for a period of 24 hours. In some embodiments the modifying organic group is attached to the carbon black. An attached organic group is not washed off of the carbon black particle when the carbon black is rinsed with a solvent in which the organic group is soluble. For example, if the organic group is a hydrophobic group that is soluble in methyl ethyl ketone or toluene, then a test can be completed using one of these solvents in a Soxhlet extractor to determine if the organic group can be removed from the carbon black after attachment. If less than 50% by weight of the organic group is rinsed off the carbon black, then the organic group is deemed to be attached to the carbon black. Other methods that may succeed in attaching organic groups to carbon blacks include, for instance, acid/base interactions and hydrogen bonding. In some cases these methods may result in attachment while in other cases the same method with different organic groups or different particles may only associate the organic group with the carbon black particle. Thus, attachment should not be determined exclusively by looking at the chemistry but should be determined by attempting to rinse off the organic group, as described above.

A variety of dispersants may also be used in conjunction with the modified carbon blacks and drilling fluids described herein, although in many embodiments the treated carbon blacks are self-dispersing and do not require additional dispersants to be added to the fluid. Dispersants are substances that can be used in aqueous and non-aqueous systems to aid in forming a dispersion of otherwise non-dispersible particulates. Dispersants include, for example, surfactants, functionalized polymers and oligomers. Dispersants may be polymeric compounds and may include synthetic polymeric dispersants, include polyvinyl alcohols, such as Elvanols from DuPont, Celvoline from Celanese, polyvinylpyrrolidones such as Luvatec from BASF, Kollidon and Plasdone from ISP, and PVP-K, Glide, acrylic or methacrylic resins (often written as "(meth)acrylic") such as poly(meth)acrylic acid, Ethacryl line from Lyondell, Alcosperse from Alco, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers; styrene-acrylic or methacrylic resins such as styrene-(meth) acrylic acid copolymers, such as the Joncryl line from BASF, Carbomers from Noveon, styrene-(meth)acrylic acid-(meth)acrylate ester copolymers, such as the Joncryl polymers from BASF, styrene-α-methylstyrene-(meth) acrylic acid copolymers, styrene-α-methylstyrene-(meth) acrylic acid-(meth)acrylate ester copolymers; styrene-maleic acid copolymers; styrene-maleic anhydride copolymers, such as the SMA™ resins from Sartomer that can be hydrolyzed in water, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof. Ethoxylates are also used in waterborne formulations as dispersants. For instance, alkylphenol ethoxylates and alkyl ethoxylates are used. Examples include PETROLITE D-1038 from Baker Petrolite. Polymers, such as those listed above, variations and related materials that can be used for dispersants and additives in aqueous coatings are included in the Tego products from Degussa, the Ethacryl products from Lyondell, the Joncryl polymers from BASF, the EFKA dispersants from Ciba, and the Disperbyk and Byk dispersants. Exemplary dispersants that may be employed include but are not limited to dispersants available from BYK Chemie and King Industries and Solsperse™ dispersants available from Noveon. Commercial emulsifiers commonly used in drilling fluids include INVERMUL and EZ MUL emulsifiers from Halliburton and emulsifiers available from M.-I. LLC.

The modified carbon blacks described herein may be prepared using any method known to those skilled in the art such that organic chemical groups are attached or associated with the carbon black pigment. For example, the modified carbon blacks can be prepared using the methods described in U.S. Pat. Nos. 5,554,739, 5,707,432, 5,837,045, 5,851, 280, 5,885,335, 5,895,522, 5,900,029, 5,922,118, 6,042,643 and 6,337,358, the contents of which are fully incorporated herein by reference. Such methods provide for a more stable attachment of the groups onto the carbon black compared to dispersant type methods, which use, for example, polymers and/or surfactants. Other methods for preparing the modified carbon blacks include reacting a carbon black having available functional groups with a reagent comprising the organic group, such as is described in, for example, U.S. Pat. No. 6,723,783, which is incorporated in its entirety by reference herein. Modified carbon blacks containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication Nos. WO 04/63289 and WO 2013/016149, as well as in N. Tsubokawa, *Polym. Sci.,* 17, 417, 1992, each of which is also incorporated in their entirety by reference herein. In preferred embodiments, the modified carbon blacks are surface treated and are chemically modified by attaching a hydrophobic organic group to a carbon black particle. Hydrophobic groups are those groups that when attached to a carbon black particle improve the dispersibility of the particle in diesel fuel when compared to the dispersibility of the untreated carbon black particle in diesel fuel. In some cases, a hydrophobic group can reduce the dispersibility of a carbon particle in water. The attachment level of the organic group on the carbon black should be adequate to provide for a reduction in resistivity when the modified carbon black is dispersed in an organic drilling fluid. The attached groups may be polymeric or non-polymeric and may include a mixture of single organic groups and polymers or oligomers composed of polymerized organic groups. Attachment levels are provided in terms of mols of organic group per surface area ($N_2SA$) of pigment. These levels of attachment can be determined by methods known to those of skill in the art, such as elemental analysis.

Groups can be attached to carbon blacks using methods such as diazonium chemistry, azo chemistry, peroxide chemistry, sulfonation and cycloaddition chemistry. Diazonium processes disclosed in one or more of the incorporated references can be adapted to provide a reaction of at least one diazonium salt with a carbon black pigment that has not yet been surface modified. Many of these diazonium processes can also be used to attach organic groups to carbon blacks that may have already been modified one or more times. As used herein, a diazonium salt is a compound including one or more diazonium groups. In some processes, the diazonium salt may be prepared prior to reaction with the carbon black or generated in situ using techniques such as those in the cited references. In situ generation allows for the use of unstable diazonium salts such as alkyl diazonium salts and avoids unnecessary handling or manipulation of the diazonium salt. In some processes, both the nitrous acid and the diazonium salt can be generated in situ.

A diazonium salt, as is known in the art, may be generated by reacting a primary amine, a nitrite and an acid. The nitrite may be any metal nitrite such as lithium nitrite, sodium nitrite, potassium nitrite, or zinc nitrite, or any organic nitrite such as, for example, isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$. The diazonium salt may also be generated by reacting the primary amine with an aqueous solution of nitrogen dioxide. The aqueous solution of nitrogen dioxide, $NO_2/H_2O$, can provide the nitrous acid needed to generate the diazonium salt. In general, when generating a diazonium salt from a primary amine, a nitrite, and an acid, two equivalents of acid are required based on the amine. In an in situ process, the diazonium salt can be generated using one equivalent of the acid.

In one set of embodiments, the organic group comprises —X(G), which is nonionic, wherein X is attached to the at least one carbon black and G is a substituent of X. The organic group may be hydrophobic in nature and may be devoid of ionic groups. For instance, the organic group may be neither a salt nor an acid. In one embodiment, X is attached, e.g., directly attached, to the carbon black surface to provide a more stable attachment of the groups onto the carbon black compared to adsorbed groups. In this embodiment, adsorbed compounds containing —X(G) groups may also be present and may contribute to the electrical properties of the carbon black as long as the carbon black surface also includes attached-X(G) groups. Methods for covalent or chemical attachment are described in more detail below. In one embodiment, X is selected from arylene, heteroarylene, and alkylene. Exemplary arylenes include phenylene, naphthylene, and biphenylene. X may also include one or more nitrogen atoms, such as one, two or more amine groups. The amine group(s) may be in the meta, ortho or para position. Exemplary heteroarylenes include phenylene, naphthylene, and biphenylene having a ring carbon substituted with one or more oxygen or nitrogen atoms. A number of useful five membered heterocycle groups are disclosed in U.S. Patent Application Publication No. 20130061773 which is incorporated by reference herein. In some embodiments, 5 membered, 6 membered and larger aromatic rings or multicyclic aromatic systems including 0, 1, 2, 3, 4 or more heteroatoms can be used. Exemplary heteroatoms include sulfur, oxygen and nitrogen, and exemplary groups containing a plurality of heteroatoms include triazoles. When X is an alkylene, examples include substituted or unsubstituted alkylenes that may be branched or unbranched. For example, the alkylene may be a $C_1$-$C_{12}$ alkylene such as methylene, ethylene, propylene, or butylene.

In one embodiment, G is a substituent of X. X can contain one or more G substituents and can be limited to one substituent, depending on the structure of X. In one embodiment, G comprises at least one group selected from: alkyls and alkylenes, e.g., —R" where —R" is a branched or unbranched $C_1$-$C_{20}$ alkyl or alkylene; carboxylic acid esters, e.g., —COOR" or —OCOR"; amides, e.g., CONHR", —CONR"$_2$, —NHCOR", or —NR"COR"; alcoxyls, ethers, ketones, and acyls. Alternatively, G may be an electron withdrawing group, such as a halogen, e.g., a fluorine containing group or fluorine itself.

In another embodiment, G comprises at least one group selected from $C_1$-$C_{20}$ alkyls and alkylenes, $C_2$-$C_{20}$ carboxylic acid esters, $C_2$-$C_{20}$ amides, $C_1$-$C_{20}$ alkoxy, $C_1$-$C_{20}$ ethers, $C_1$-$C_{20}$ ketones, and $C_1$-$C_{20}$ acyls. In other embodiments, G comprises at least one group selected from $C_{10}$-$C_{20}$ alkyls and alkylenes, $C_2$-$C_8$ carboxylic acid esters, $C_2$-$C_8$ amides, $C_2$-$C_8$ alkoxy, $C_2$-$C_8$ ethers, $C_2$-$C_8$ ketones, and $C_2$-$C_8$ acyls. In one set of embodiments, G is a $C_2$-$C_8$ carboxylic acid alkyl ester. The ester group may be, for example, at the 2, 3, 4, 5, 6 or 7 position. In some embodiments, the carboxylic acid ester may include a branched alkyl group or a phenyl group and may also include one or more double bonds. G may also include one, two or three sulfur atoms. Alternatively, G may include a halide.

In many embodiments, —X(G) is a non-halogenated hydrophobic species. In some embodiments, the species —X(G), or the treating agent species that modifies the carbon black to be attached to X-(G), exhibits a polarity greater than an alkane or greater than an ether. In the same or other embodiments, the species can exhibit a polarity that is less than an alcohol, less than a ketone, less than an aldehyde or less than an amine. In some embodiments, the species is an ester or exhibits the polarity of an ester.

In one embodiment, —X(G) has a molecular weight of less than 4000, such as a molecular weight of less than 3000, a molecular weight of less than 2000, a molecular weight of less than 1500, a molecular weight of less than 1000, a molecular weight of less than 500 or a molecular weight of less than 250. —X(G) may be chemically combined with additional —X(G) groups to produce a poly X(G) group, $[X(G)]_n$, where n can be, for example, greater than or equal to 2 and less than or equal to 25. These poly X(G) groups may have molecular weights of greater than 500 and in some embodiments also have a molecular weight of less than 4000, such as a molecular weight of less than 3000, a molecular weight of less than 2000 or a molecular weight of less than 1500. In one embodiment, the carbon black is substituted with two or more different —X(G) groups, resulting in a distribution of molecular weights, where the average MW is less than 4000, less than 3000, less than 2000 or less than 1500.

In a specific set of embodiments, X can be an aniline group that, when reacted with a carbon black as described above allows the phenyl group to become directly attached to the carbon black. G can be attached to the phenyl group at the para position, and G an oxygen containing group such as an ether or ester linkage. The ether or ester linkage can connect an alkyl group to the phenyl group. The alkyl group may be, for example, a methyl, ethyl, propyl, butyl, pentyl or hexyl group. A specific example of —X(G) that can be reacted with a carbon black to produce a hydrophobically modified carbon black includes butyl 4-aminobenzoate (BAB). An alternative example of —X(G) that can be reacted with a carbon black is 4-fluoroaniline (4-FA). In one embodiment, the fluoroaniline is reacted with the carbon black to achieve a final treatment level of about 1 $\mu mol/m^2$.

Organic drilling fluids can include a range of concentrations of modified carbon blacks that depend on a variety of factors including the chemistry of the drilling fluid, the chemistry of the modified carbon black and the desired level of electric conductivity in the fluid. In various embodiments, concentrations of modified carbon black in organic drilling fluid, by weight, can be greater than 0.5%, greater than 1%, greater than 2%, greater than 5% or greater than 7%. Carbon black concentrations may also be less than 10%, less than 7%, less than 5%, less than 3% or less than 2% by weight.

Carbon blacks can be incorporated into organic drilling fluids using any process that results in a stable dispersion of carbon black in the drilling fluid. For instance, carbon blacks may be incorporated directly into a drilling fluid in dry form or may first be dispersed in a fluid which is then let down in a drilling fluid. In some instances, the carbon black can be dispersed in or mixed into one or more of the components of the organic drilling fluid (e.g. the organic phase or an additive package) prior to the formulation of the fluid itself. When millbases are used, the liquid vehicle of the millbase can be compatible with the organic drilling fluid with which the millbase will be used. The liquid vehicle may be water-based or may be a non-aqueous fluid and may have a flash point greater than, for example, 100° C. In some cases, the liquid vehicle can be identical to one of the components of the drilling fluid. For instance, in some cases the liquid vehicle can be diesel or mineral oil. In other embodiments the liquid vehicle of the millbase can be removed from the drilling fluid after the millbase has been added to the drilling fluid. In other instances, the millbase liquid vehicle can be drilling fluid containing a higher concentration of carbon black than the target level for field use. Millbases may include materials in addition to the carbon black such as dispersants, surfactants, colorants, tracers and biocides. Carbon black concentrations in millbases may be, for example, greater than 10%, greater than 20%, greater than 30% or greater than 40% by weight. In some embodiments, the millbase may include less than 50%, less than 40%, less than 30% or less than 20%, by weight of carbon black dispersed in a fluid. Millbases can be made using methods known to those of skill in the art, for example, by combining the components and forming a dispersion using a mixer such as a Scandex paint shaker.

In some cases, carbon black can be added to a drilling fluid by flowing the fluid through a solid sample of the carbon black, or the carbon black can be allowed to diffuse out of a larger carrier particle into the fluid. Modified carbon black can be added in stages to a drilling fluid, and the amount of carbon black in a drilling fluid can be altered after the fluid is in use. For example, dry modified carbon black, or a millbase of dry modified carbon black, can be added to a drilling fluid as it is cycled through a borehole. In some cases, monitoring of the electrical properties of the fluid, such as resistivity, can provide a value that drives a feedback mechanism for adding modified carbon black to the fluid when resistivity increases beyond a threshold level.

EXAMPLES

Modified carbon black samples were prepared and dispersed in an oil-based drilling fluid surrogate to evaluate their effect on the resistivity of the fluid. Three different base carbon blacks (listed below, all from Cabot Corporation) were used and two different treatments were evaluated at a number of different concentrations. Some of the properties of these carbon blacks, prior to treatment, are provided in Table 1 below.

TABLE 1

| Carbon Black | OAN Structure | BET Surface Area | Average primary particle size |
| --- | --- | --- | --- |
| Vulcan ® XC72 | 174 mL/100 g | 254 $m^2/g$ | 30 nm |
| Vulcan XC305 | 128 mL/100 g | 71 $m^2/g$ | 27 nm |
| Black Pearls ® 700 | 122 mL/100 g | 200 $m^2/g$ | 18 nm |

Example 1

Carbon black modified by treating with 4-F-aniline was made according the following procedure. Deionized water, 660 g, was charged to a 2 L glass reactor equipped with overhead stirrer, thermocouple and condenser. 80 g of Vulcan XC72 carbon black was slowly added to the reactor under mild agitation for 10 minutes. 4-F-aniline (13.55 g) was then added to the reaction mixture drop-wise and stirred for 10 minutes. 30% methanesulfonic acid, 38.9 g was slowly added to the reactor while stirring. The reaction mixture was then heated to 65° C. while stirring. After reaching the desired temperature, 36 g of iso-propanol was slowly added to the reaction mixture. Sodium nitrite 20% aqueous solution, 42.03 g was added slowly drop-wise. The reaction mixture was stirred for 90 min at 65° C. After the reaction mixture cooled down, the treated Vulcan XC-72 carbon black was separated on a Buchner filter, rinsed several times with water and dried overnight at 85° C.

Samples having treatment levels of 0.75 μmol/m², 1.0 μmol/m², 1.25 μmol/m² and 2.0 were obtained by stoichiometrically altering the concentrations of the organic group, the methanesulfonic acid and the sodium nitrite solution. When recording treatment levels (surface loading) the units are in micromoles of treating agent per square meter of surface area by $N_2SA$.

Example 2

Carbon black modified by treating with Butyl-4-aminobenzoate (BAB) was made according the following procedure. Deionized water, 325 g, was charged to a 1 L glass reactor equipped with overhead stirrer, thermocouple and condenser. 75 g of Vulcan XC72 carbon black was slowly added to the reactor under mild agitation for 10 min. BAB, 2.76 g was then added to the reaction mixture drop-wise and stirred for 20 minutes. 30% methanesulfonic acid, 4.58 g, was slowly added to the reactor while stirring. The reaction mixture was heated to 65° C. while stirring at 250 rpm. After reaching the desired temperature, 20 g of iso-propanol was slowly added to the reaction mixture. Sodium nitrite 20% aqueous solution, 4.93 g, was added slowly drop-wise over 10 minutes. The reaction mixture was stirred for 120 min at 65° C. After the reaction mixture cooled down, the treated carbon black was separated on a Buchner filter with #1 paper filter, rinsed several times with water and dried overnight at 85° C. to obtain treated material at a loading of 0.75 μmol/m². To produce different surface concentrations of the organic group, quantities of BAB, methanesulfonic acid and sodium nitrite solution were adjusted stoichiometrically to provide modified carbon black samples having treatment levels of 0.5 μmol/m², 0.75 μmol/m², 1.0 μmol/m², 1.25 μmol/m², 1.5 μmol/m², 2.0 μmol/m², and 3.0 μmol/m².

Butyl-4-aminobenzoate (BAB)

Example 3

A second base carbon black, Black Pearls 700, was treated with BAB using the same process as described in Example 2. The treatment levels were 0 μmol/m² (control), 1.0 μmol/m², 2.0 μmol/m², 3.0 μmol/m² and 4.0 μmol/m².

Example 4

A third base carbon black, Vulcan XC305, was modified with BAB using the process as described for Example 2. The treatment levels were 1.0 μmol/m², 2.0 μmol/m² and 3.0 μmol/m².

Table 2 identifies each modified carbon black and the base carbon black, the organic group, and the treatment level of the organic group for each of the samples. Vulcan XC72R carbon black is the fluffy counterpart to Vulcan XC72 carbon black, which is pelletized.

TABLE 2

| Sample # | Base Carbon Black | Organic treatment | Treatment level (μmol/m²) |
|---|---|---|---|
| 1 | Vulcan XC305 | BAB | 1 |
| 2 | Vulcan XC305 | BAB | 2 |
| 3 | Vulcan XC305 | BAB | 3 |
| 4 | Black Pearls 700 | None (control) | 0 |
| 5 | Black Pearls 700 | BAB | 1 |
| 6 | Black Pearls 700 | BAB | 2 |
| 7 | Black Pearls 700 | BAB | 3 |
| 8 | Black Pearls 700 | BAB | 4 |
| 9 | Vulcan XC72 | BAB | 0.5 |
| 10 | Vulcan XC72 | BAB | 0.75 |
| 11 | Vulcan XC72 | BAB | 1 |
| 12 | Vulcan XC72 | BAB | 1.25 |
| 13 | Vulcan XC72 | BAB | 1.5 |
| 14 | Vulcan XC72 | BAB | 2 |
| 15 | Vulcan XC72 | BAB | 3 |
| 16 | Vulcan XC72 | 4-F-aniline | 0.75 |
| 17 | Vulcan XC72 | 4-F-aniline | 1.0 |
| 18 | Vulcan XC72 | 4-F-aniline | 1.25 |
| 19 | Vulcan XC72 | 4-F-aniline | 2 |
| 20 | Vulcan XC72R | None | 0 |

Figure 1:
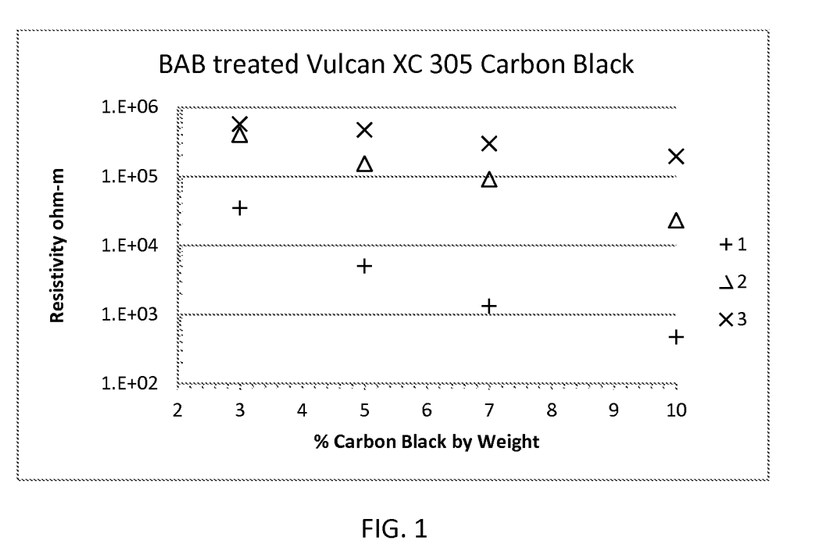
FIG. 1 graphically illustrates electrical resistivity vs. carbon black concentration for one set of embodiments.
Figure 2:
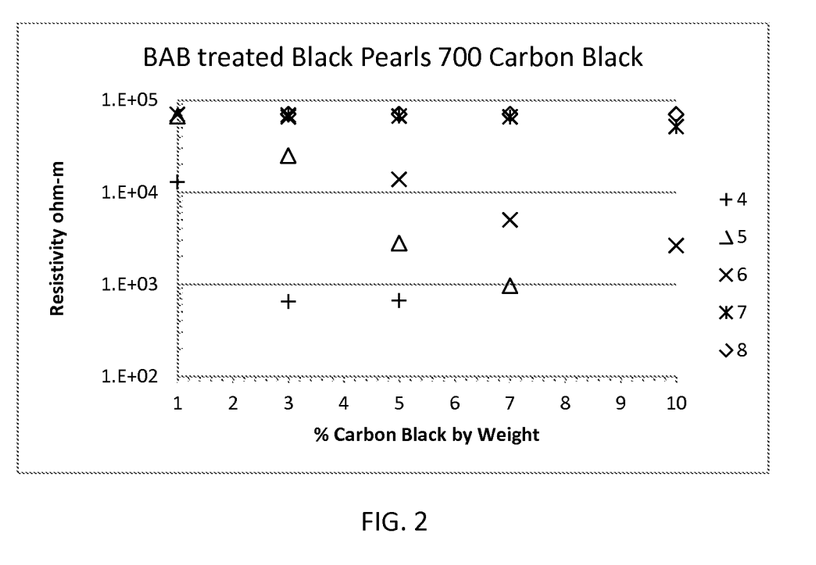
FIG. 2 graphically illustrates electrical resistivity vs. carbon black concentration for a second set of embodiments.
Figure 3:
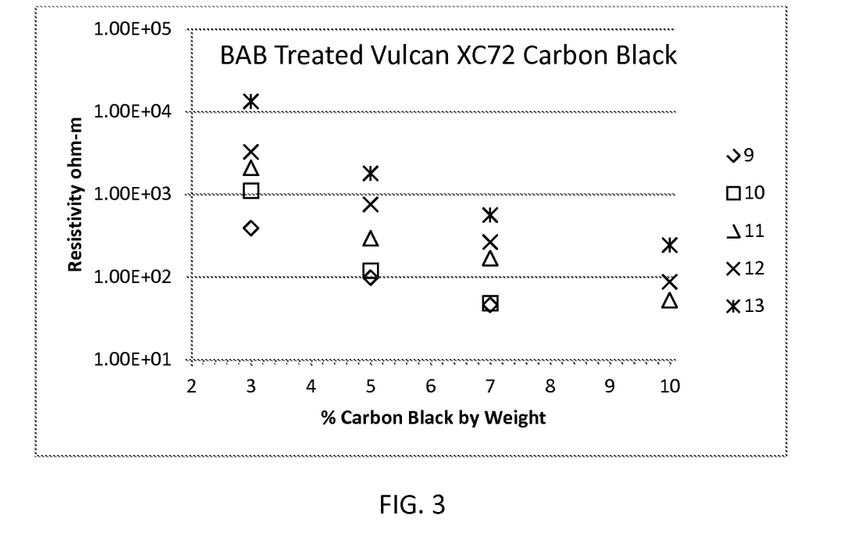
FIG. 3 graphically illustrates electrical resistivity vs. carbon black concentration for a third set of embodiments.
Figure 4:
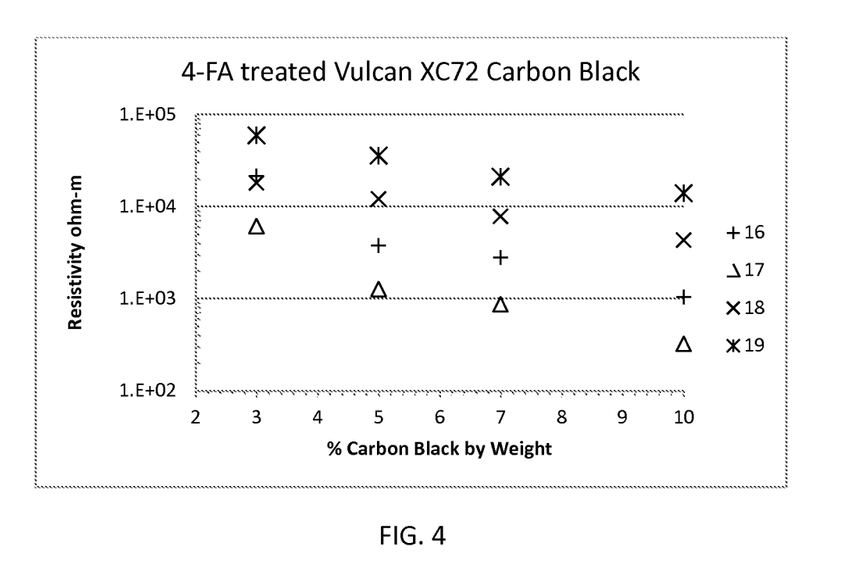
FIG. 4 graphically illustrates electrical resistivity vs. carbon black concentration for a fourth set of embodiments.

To assess the performance of the modified carbon blacks produced in Examples 1-4, each sample was dispersed in an OBM surrogate solvent (butyl acetate) at a range of loadings. The dispersions were analyzed for volume resistivity. After filtering, washing and drying, a millbase of each of the modified carbon blacks was made in butyl acetate. Each millbase contained 10% by weight of modified carbon black in butyl acetate. The samples were dispersed using a Scandex S0400 laboratory paint shaker for a time period of 4 hours. A millbase of the control sample, unmodified Black Pearls 700 carbon black, was produced in the same manner. Each millbase was subsequently let down in butyl acetate to produce dispersions at loadings of 1%, 3%, 5%, 7% and 10% surface treated carbon black by weight. Not all treated carbon blacks were let down to all concentrations. The resistivity of each of the prepared dispersions was measured at 30 seconds using a Keithley Model 6517A High Resistivity Meter connected to ETS Model 828 volume resistivity test cell. Results comparing volume resistivity vs the concentration of modified carbon black are shown Table 3 and in FIGS. 1-4. Results are not provided for samples that were too viscous to measure at loadings of 7% and 10%. As shown in the figures, the dispersion that was most effective at lowering the resistivity of the organic fluid was the Vulcan XC72 carbon black with relatively low levels of BAB attached to the carbon black. For instance, FIG. 3 shows that at BAB treatment levels of 0.5, 0.75, 1.0 and 1.25 μmol/m², the modified Vulcan XC72 material reduced the resistivity of the surrogate fluid to below 100 ohm-m, meaning that these surrogate samples would be amenable to microresistivity imaging.

TABLE 3

Carbon Black and Treatment Level

| Sample | Base Carbon Black | Treatment Agent | Treatment (μmol/m²) | Resistivity (ohm-m) | | | | |
|---|---|---|---|---|---|---|---|---|
| | | | | 1% CB | 3% CB | 5% CB | 7% CB | 10% CB |
| 1 | Vulcan XC 305 | BAB | 1 | | 34800 | 5050 | 1320 | 472 |
| 2 | Vulcan XC 305 | BAB | 2 | | 402000 | 152000 | 90000 | 23000 |
| 3 | Vulcan XC 305 | BAB | 3 | | 568000 | 468000 | 296000 | 194000 |
| 4 | Black Pearls 700 | None | 0 | 13000 | 650 | 670 | | |
| 5 | Black Pearls 700 | BAB | 1 | 66800 | 25000 | 2800 | 960 | |
| 6 | Black Pearls 700 | BAB | 2 | 70000 | 65800 | 13800 | 5000 | 2640 |
| 7 | Black Pearls 700 | BAB | 3 | | 68800 | 67000 | 66000 | 51800 |
| 8 | Black Pearls 700 | BAB | 4 | | 70500 | 70700 | 70500 | 70000 |
| 9 | Vulcan XC72 | BAB | 0.5 | | 389 | 97.5 | 45.7 | |
| 10 | Vulcan XC72 | BAB | 0.75 | | 1098 | 118 | 47.6 | |
| 11 | Vulcan XC72 | BAB | 1 | | 2080 | 292 | 168 | 52 |
| 12 | Vulcan XC72 | BAB | 1.25 | | 3250 | 754 | 263 | 87 |
| 13 | Vulcan XC72 | BAB | 1.5 | | 13300 | 1780 | 556 | 241 |
| 14 | Vulcan XC72 | BAB | 2 | | 437000 | 271000 | 144000 | 60900 |
| 15 | Vulcan XC72 | BAB | 3 | | 2860000 | 1144000 | 1050000 | 642000 |
| 16 | Vulcan XC72 | 4-FA | 0.75 | | 21300 | 3740 | 2780 | 1040 |
| 17 | Vulcan XC72 | 4-FA | 1.0 | | 6100 | 1260 | 860 | 320 |
| 18 | Vulcan XC72 | 4-FA | 1.25 | | 18000 | 12000 | 7760 | 4300 |
| 19 | Vulcan XC72 | 4-FA | 2 | | 59000 | 35500 | 21000 | 13900 |
| 20 | Vulcan XC72R | None | 0 | 5650 | 910 | 185 | | |

Example 5

Figure 5:
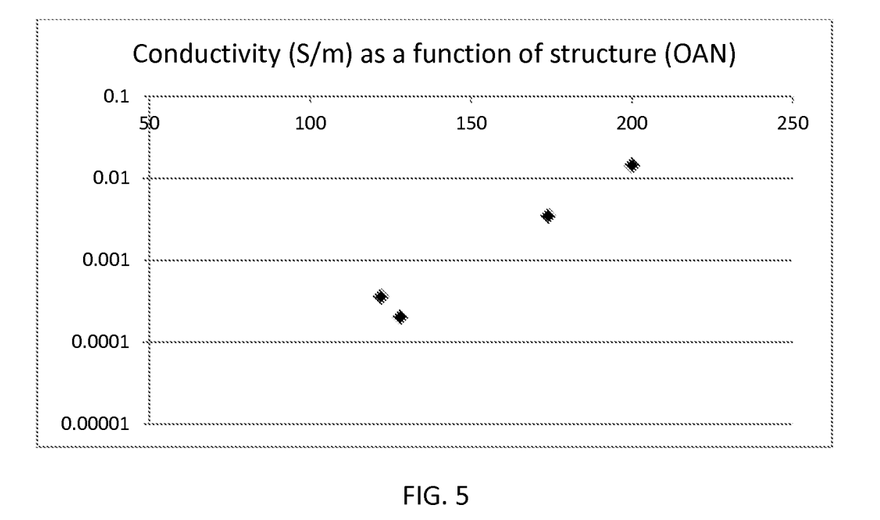
FIG. 5 graphically illustrates the relationship between structure and conductivity for another set of embodiments.

To determine the effect of structure on the conductivity of the carbon blacks in non-aqueous systems, four different materials were each treated with the same concentration of the hydrophobic treating agent (BAB). The carbon blacks were Black Pearls 700 (Cabot), Vulcan XC305 (Cabot), Vulcan XC72 (Cabot) and Denka acetylene black (Denka). The different carbon blacks, each having different structure as measured by OAN, were treated with BAB at a surface concentration of 1 μmol/m² and then dispersed in butyl acetate, as above, at a concentration of 5% treated carbon black by weight. Resistivity and conductivity were measured as in Example 4, and data are reported in both Table 4, below, and in FIG. 5. The results show that while conductivity of the dispersion is essentially independent of surface area ($N_2SA$), the conductivity is directly related to the structure of the carbon black. It is believed that the lack of correlation of conductivity with surface area means that the surface treatment compounds (equivalent loading among the samples on a mol to surface area basis) do not enhance conductivity although they do improve dispersibility. It is believed instead that the high structure of the conductive particles, not the surface area, provides a particle surface that allows for adequate treatment levels while maintaining untreated surface areas that remain electrically conductive.

TABLE 4

| Carbon Black | OAN (ml/100 g) | $N_2SA$, m2/g | Resistivity (ohm-m) | Conductivity (S/m) |
|---|---|---|---|---|
| Black Pearls 700 | 122 | 220 | 2,800 | 0.000357 |
| Vulcan XC305 | 128 | 71 | 5,000 | 0.0002 |
| Vulcan XC72 | 174 | 254 | 290 | 0.00345 |
| Denka | 200 | 69 | 70 | 0.0143 |

Example 6

Figure 6:
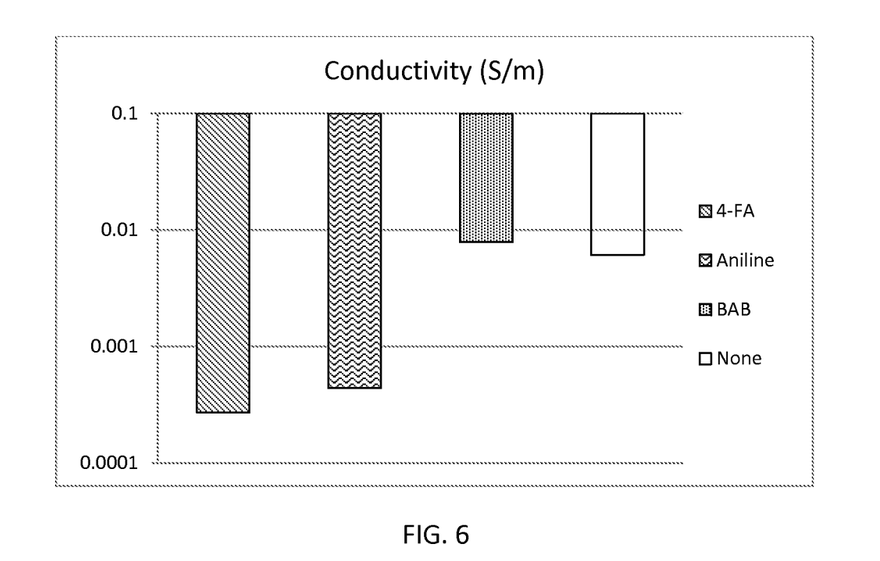
FIG. 6 provides a graph showing the conductivity of one embodiment of emulsions including carbon blacks modified with a variety of treating agents.

To examine the effect of different treating agents on the same carbon black, three different samples of Vulcan XC72 carbon black were treated at 0.75 μmol/m² with butyl 4-aminobenzoate (BAB), 4-fluoroaniline (4-FA) and aniline. These three samples, as well as an untreated sample, were dispersed in butyl acetate at 5% by weight. The resistivity and conductivity of each of the samples was measured. Results are provided in Table 5, below, and in FIG. 6. The untreated sample resulted in a high viscosity gel that would not be useable as a drilling fluid. The BAB treated material exhibited good viscosity and provided significantly better conductivity than did the aniline or 4-FA treated materials. This indicates that the attached organic group comprising a phenyl group and an ester group provided much better conductivity than attached organic groups comprising a phenyl group alone or a phenyl group and a halogen atom. This is surprising as halogenated materials, and especially phenyl groups including a fluorine atom, are known to those of skill in the art to provide conductivity when associated with materials such as acid treated graphite.

TABLE 5

| Carbon Black Treatment | Resistivity (ohm-m) | Conductivity (S/m) |
|---|---|---|
| 4-FA | 3,740 | 0.00027 |
| Aniline | 2,260 | 0.00044 |
| BAB | 127 | 0.00787 |
| None | 163 | 0.00613 |

Example 7

The prior examples were completed using butyl acetate as a surrogate for organic drilling fluids. To confirm that the treated carbon blacks described herein perform similarly in invert emulsion drilling fluids, the following experiment was performed. A millbase was prepared using 7 wt. % Vulcan XC72 carbon black that had been treated with BAB at a loading of 0.75 μmol/m² in butyl acetate. 10 g of this millbase were mixed with 13.3 g of Escaid 110 oil, 7 g of 25% (w/w) calcium chloride brine and 0.5 g of a nonionic surfactant (Span 80 sorbitan oleate)(Aldrich). The components were emulsified and the resulting invert emulsion (Emulsion A) included 3% by weight of BAB treated Vulcan XC72 carbon black and an organic phase of 40% butyl acetate/60% Escaid 110 oil (wt/wt). This emulsion had a resistivity of 59,000 ohm-m. A second invert emulsion (Emulsion B) was made using the same method with 17 g of the BAB treated Vulcan XC72 carbon black millbase, 6.8 g of Escaid 110 oil, 7 g of the 25% calcium chloride brine and 0.5 g Span 80 surfactant. Emulsion B included 5% by weight of BAB treated Vulcan XC72 carbon black and an organic phase of 70% butyl acetate/30% Escaid 110 oil (wt/wt). This emulsion had a resistivity of 15,000 ohm-m. In contrast, butyl acetate, without carbon black or Escaid 110 oil, exhibits a resistivity of 565,000 ohm-m. Resistivity was measured as in Example 4.

The present invention includes the following aspects/embodiments/features in any order and/or in any combination:

1. The present invention relates to an organic drilling fluid comprising:
   an invert emulsion including a continuous organic phase and an emulsified aqueous phase;
   a surface treated carbon black dispersed in the invert emulsion at a concentration of at least 0.5% by weight; and
   wherein the conductive organic drilling fluid has a volume resistivity of less than $10^5$ ohm-m.
2. The present inventions, alternatively or in addition, relates to an organic drilling fluid comprising:
   a non-conductive continuous phase of organic or synthetic liquid;
   an aqueous phase supported in the liquid as an invert emulsion; and
   a surface treated carbon black dispersed in the solvent at a concentration of greater than 0.5% by weight, wherein the drilling fluid exhibits a resistivity that is at least a factor of 100 less than the resistivity of the non-conductive continuous phase.
3. The organic drilling fluid of any preceding or following aspects/embodiments/features wherein the carbon black has a OAN structure of greater than 150 mL/100 g, greater than 170 mL/100 g or greater than 190 mL/100 g by ASTM D2414.
4. The organic drilling fluid of any preceding or following aspects/embodiments/features wherein the carbon black includes an attached organic group.
5. The organic drilling fluid of any preceding or following aspects/embodiments/features wherein the organic group comprises a hydrophobic group.
6. The organic drilling fluid of any preceding or following aspects/embodiments/features wherein the organic group does not include an ionic or ionizable group.
7. The organic drilling fluid of any any preceding or following aspects/embodiments/features wherein the organic group comprises a polymer or oligomer.
8. The organic drilling fluid of any preceding or following aspects/embodiments/features wherein the organic group is attached to the carbon black at a surface loading of 0.1 to 1.5 µmol/m$^2$, 0.2 to 1.25 µmol/m$^2$, 0.5 to 1 µmol/m$^2$, 0.3 to 0.75 µmol/m$^2$, or 0.75 to 1.5 µmol/m$^2$.
9. The organic drilling fluid of any preceding or following aspects/embodiments/features wherein the organic group comprises at least one aryl group.
10. The organic drilling fluid of any preceding or following aspects/embodiments/features wherein the organic group comprises oxygen.
11. The organic drilling fluid of any preceding or following aspects/embodiments/features wherein the organic group comprises an ester or a fluoride atom.
12. The organic drilling fluid of any preceding or following aspects/embodiments/features wherein the surface treated carbon black includes an oligomer or a polymer having a molecular weight of less than 2000.
13. The organic drilling fluid of any preceding or following aspects/embodiments/features wherein the carbon black is directly attached to an aryl group.
14. The organic drilling fluid of any preceding or following aspects/embodiments/features wherein the carbon black is directly attached to an aryl group linked to an alkyl group via an ester linkage and the alkyl group comprises fewer than 20, fewer than 15, fewer than 12, fewer than 10 or fewer than 8 carbon atoms.
15. The organic drilling fluid of any preceding or following aspects/embodiments/features wherein the drilling fluid includes dispersed surface treated carbon black at a concentration of 0.5 to 10% by weight, 1.0 to 7% by weight, 1.5 to 5% by weight, 3 to 10% by weight or 4 to 8% by weight.
16. The organic drilling fluid of any preceding or following aspects/embodiments/features wherein a carbon black particle is in surface contact with both the aqueous phase and the organic phase.
17. The organic drilling fluid of any preceding or following aspects/embodiments/features including an electrically conductive network of carbon black particles and aqueous phase droplets.
18. The organic drilling fluid of any preceding or following aspects/embodiments/features, wherein the fluid has a volume resistivity of less than $10^5$ ohm-m or between $10^5$ and 1 ohm-m.
19. The organic drilling fluid of any preceding or following aspects/embodiments/features, wherein the fluid has a volume resistivity of less than $10^4$ ohm-m, $10^3$ ohm-m, $10^2$ ohm-m, or 10 ohm-m, or between $10^5$ and 10 ohm-m or between $10^5$ and 1 ohm-m.
20. The organic drilling fluid of any preceding or following aspects/embodiments/features wherein the volume resistivity of the fluid is at least a factor of 100 less than the volume resistivity of the organic phase alone.
21. The organic drilling fluid of any preceding or following aspects/embodiments/features, wherein the volume resistivity of the fluid is at least a factor of 500, $10^3$, $10^4$, or up to $10^5$ less than the volume resistivity of the organic phase alone.
22. The organic drilling fluid of any preceding or following aspects/embodiments/features wherein the organic phase comprises mineral oil, diesel, naphthenic oil, or paraffin oil.
23. The organic drilling fluid of any preceding or following aspects/embodiments/features wherein the carbon black concentration is less than 10% by weight.
24. The organic drilling fluid of any preceding or following aspects/embodiments/features wherein the carbon black concentration is greater than 1% by weight.
25. The organic drilling fluid of any preceding or following aspects/embodiments/features wherein the carbon black concentration is greater than 3% by weight.
26. The organic drilling fluid of any preceding or following aspects/embodiments/features wherein the modified carbon black shows no measurable increase in particle size after 24 hours of dispersion in the drilling fluid.
27. The organic drilling fluid of any preceding or following aspects/embodiments/features wherein the water or brine content is between 5 and 40 percent by weight.

28. The organic drilling fluid of any preceding or following aspects/embodiments/features wherein the organic drilling fluid comprises an oil-based drilling fluid.
29. The organic drilling fluid of any preceding or following aspects/embodiments/features wherein the organic drilling fluid comprises a synthetic drilling fluid.
30. The present invention, alternatively or additionally, relates to a method of producing an electrically conductive organic drilling fluid, the method comprising:
    emulsifying a brine in a non-conductive organic liquid to produce a two-phase system, the brine making up less than 40% by weight of the two-phase system;
    dispersing a plurality of carbon black particles in the two phase system to produce the conductive organic drilling fluid; and
    wherein the drilling fluid has an electrical resistivity of less than $10^5$ ohm-m, $10^4$ ohm-m, $10^3$ ohm-m, $10^2$ ohm-m, or 10 ohm-m, or between $10^5$ and 10 ohm-m or between $10^5$ and 1 ohm-m.
31. The method of any preceding or following aspects/embodiments/features wherein the organic liquid comprises diesel, mineral oil, naphthenic oil or paraffin oil.
32. The method of any preceding or following aspects/embodiments/features wherein the organic drilling fluid comprises an oil-based drilling fluid or a synthetic drilling fluid.
33. The method of any preceding or following aspects/embodiments/features comprising adding the particles to the organic liquid prior to producing the two phase system.
34. The method of any preceding or following aspects/embodiments/features comprising adding the particles to the brine prior to producing the two phase system.
35. The present invention, alternatively or additionally, relates to a method of reducing the volume resistivity of an organic system, the method comprising:
    forming an organic system comprising an emulsion, the emulsion including a continuous organic phase and an emulsified aqueous phase;
    forming a dispersion of a modified carbon black in the organic system wherein the dispersion has a volume resistivity at least 100 times lower than the organic system in the absence of the modified carbon black; and
    maintaining the emulsion and the dispersion for at least 24 hours.
36. The method of any preceding or following aspects/embodiments/features wherein the carbon black comprises an attached organic group.
37. The method of any preceding or following aspects/embodiments/features wherein the organic group comprises a hydrophobic group.
38. The method of any preceding or following aspects/embodiments/features wherein the organic group does not include an ionic or ionizable group.
39. The method of any preceding or following aspects/embodiments/features wherein the organic group comprises a polymer or oligomer.
40. The method of any preceding or following aspects/embodiments/features wherein the organic group is attached to the carbon black at a surface loading of 0.1 to 1.5 µmol/m², 0.2 to 1.25 µmol/m², 0.5 to 1 µmol/m², 0.3 to 0.75 µmol/m², or 0.75 to 1.5 µmol/m².
41. The method of any preceding or following aspects/embodiments/features wherein the organic group comprises at least one aryl group.
42. The method of any preceding or following aspects/embodiments/features wherein the organic group comprises oxygen.
43. The method of any preceding or following aspects/embodiments/features wherein the organic group comprises an ester or a fluoride atom.
44. The method of any preceding or following aspects/embodiments/features wherein the surface treated carbon black includes an oligomer or a polymer having a molecular weight of less than 2000.
45. The method of any preceding or following aspects/embodiments/features wherein the carbon black is directly attached to an aryl group.
46. The method of any preceding or following aspects/embodiments/features wherein the carbon black is directly attached to an aryl group linked to an alkyl group via an ester linkage and the alkyl group comprises fewer than 20, fewer than 15, fewer than 12, fewer than 10 or fewer than 8 carbon atoms.
47. The present invention, additionally or alternatively, relates to a conductive emulsion comprising:
    greater than 50% by volume of a non-conducting fluid;
    a conductive fluid emulsified in the non-conducting fluid;
    at least 1% by weight of a modified carbon black dispersed in the emulsion, the modified carbon black produced from a base carbon black having an OAN of greater than 150 mL/100 g or 175 mL/100 g, the modified carbon black comprising:
    an uncharged hydrophobic treating agent directly attached to the carbon black, the treating agent comprising an aryl group, an alkyl group and a C=O group and/or C—O—C group;
    wherein the conductive emulsion is non-conductive in the absence of the modified carbon black.
48. The present invention, additionally or alternatively, relates to a conductive emulsion comprising:
    greater than 50% by volume of a non-conducting fluid;
    a conductive fluid emulsified in the non-conducting fluid;
    at least 1% by weight of a modified carbon black dispersed in the emulsion, the modified carbon black produced from a base carbon black having an OAN of greater than 150 mL/100 g or 175 mL/100 g, the modified carbon black comprising:
    an uncharged hydrophobic group directly attached to the carbon black, the hydrophobic group comprising a fluorinated aryl group;
    wherein the conductive emulsion is non-conductive in the absence of the modified carbon black.
49. A drilling fluid comprising the conductive emulsion having any of the previous or following aspects/embodiments/features.
50. The conductive emulsion any of the previous aspects/embodiments/features, having a volume resistance of less than $10^5$ ohm-m, $10^4$ ohm-m, $10^3$ ohm-m, $10^2$ ohm-m, or 10 ohm-m, or between 1 ohm-m and $10^5$ ohm-m.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. An organic drilling fluid comprising:
    an invert emulsion including a continuous organic phase and an emulsified aqueous phase;
    a surface treated carbon black having a OAN structure of greater than 150 mL/100 g by ASTM D2414 and a BET surface area of less than 500 m$^2$/g dispersed in the invert emulsion at a concentration of at least 0.5% by weight; and
    wherein the carbon black includes an attached organic group comprising either a) an aryl group, an alkyl group and a C═O group and/or C—O—C group, or b) a fluorinated aryl group, the organic group being attached to the carbon black at a surface loading of 0.1 to 1.5 μmol/m$^2$, and
    wherein the conductive organic drilling fluid has a volume resistivity of either a) less than 10$^5$ ohm-m or b) at least a factor of 100 less than the resistivity of the organic phase in the absence of the surface treated carbon black.

2. The organic drilling fluid of claim 1 wherein a carbon black particle is in surface contact with both the aqueous phase and the organic phase.

3. The organic drilling fluid of claim 1 including an electrically conductive network of carbon black particles and aqueous phase droplets.

4. The organic drilling fluid of claim 1 wherein the modified carbon black shows no measurable increase in particle size after 24 hours of dispersion in the drilling fluid.

5. A method of producing an electrically conductive organic drilling fluid, the method comprising:
    emulsifying a brine in a non-conductive organic liquid to produce a two-phase system, the brine making up less than 40% by weight of the two-phase system;
    dispersing a plurality of surface treated carbon black particles having a OAN structure of greater than 150 mL/100 g by ASTM D2414 and a BET surface area of less than 500 m$^2$/g in the two phase system to produce the conductive organic drilling fluid; and
    wherein the carbon black includes an attached organic group comprising either a) an aryl group, an alkyl group and a C═O group and/or C—O—C group, or b) a fluorinated aryl group, the organic group being attached to the carbon black at a surface loading of 0.1 to 1.5 μmol/m$^2$, and
    wherein the drilling fluid has an electrical resistivity of less than 10$^5$ ohm-m, a volume resistivity at least 100 times greater than that of the organic liquid in the absence of the carbon black particles, or both.

6. The method of claim 5 comprising adding the particles to the organic liquid prior to producing the two phase system.

7. The method of claim 5 comprising adding the particles to the brine prior to producing the two phase system.

8. The method of claim 5, further comprising maintaining the dispersion of carbon black in the two phase system for at least 24 hours.

* * * * *